United States Patent
Ahmad et al.

(10) Patent No.: US 10,007,775 B2
(45) Date of Patent: *Jun. 26, 2018

(54) MANAGING ACCESS TO AN ELECTRONIC SYSTEM

(71) Applicant: INTERNATIONAL BUSINESS MACHINES CORPORATION, Armonk, NY (US)

(72) Inventors: Faraz Ahmad, Uttar Pradesh (IN); Adekunle Bello, Pflugerville, TX (US); Gregory J. Boss, Saginaw, MI (US); Anto A. R. John, Tamil Nadu (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/418,723

(22) Filed: Jan. 28, 2017

(65) Prior Publication Data

US 2017/0140143 A1    May 18, 2017

Related U.S. Application Data

(63) Continuation of application No. 14/734,021, filed on Jun. 9, 2015, now Pat. No. 9,626,500.

(51) Int. Cl.

| | |
|---|---|
| *G06F 21/36* | (2013.01) |
| *G06F 3/0481* | (2013.01) |
| *G06F 3/0485* | (2013.01) |
| *G06F 3/0488* | (2013.01) |
| *G06F 3/0484* | (2013.01) |
| *G06F 21/62* | (2013.01) |

(52) U.S. Cl.
CPC ............ *G06F 21/36* (2013.01); *G06F 3/0485* (2013.01); *G06F 3/0488* (2013.01); *G06F 3/04817* (2013.01); *G06F 3/04842* (2013.01); *G06F 21/6218* (2013.01)

(58) Field of Classification Search
CPC ....... G06F 21/36; G06F 3/0488; H04W 12/06
See application file for complete search history.

(56) References Cited

U.S. PATENT DOCUMENTS

| 7,231,231 B2 | 6/2007 | Kokko et al. |
| 8,504,842 B1 | 8/2013 | Meacham |
| 8,589,374 B2 | 11/2013 | Chaudhri |

(Continued)

OTHER PUBLICATIONS

"TinyLock: affordable defense against smudge attacks on smartphone pattern lock systems", Taekyoung, K. et al., May 2014, www.sciencedirect.com, Computers and Security, 42 (2014) 137-150.

(Continued)

*Primary Examiner* — Dao Q Ho
(74) *Attorney, Agent, or Firm* — Paul S. Drake (57) ABSTRACT

A method, system or computer usable program product for managing access to an electronic system through a touchscreen device including presenting a display of a first and a second scrolling stream of icons; responsive to user input, detecting contemporaneous selection of a first icon from the first scrolling stream and a second icon from the second scrolling stream; and responsive to the selection of the first and second icon matching an established unlock pattern, unlocking the electronic system.

20 Claims, 6 Drawing Sheets

(56) References Cited

U.S. PATENT DOCUMENTS

| | | |
|---|---|---|
| 2008/0220752 A1 | 9/2008 | Forstall et al. |
| 2009/0167717 A1 | 7/2009 | Wang et al. |
| 2011/0187727 A1 | 8/2011 | Ahn et al. |
| 2011/0300831 A1* | 12/2011 | Chin .................. G06F 1/3203 455/411 |
| 2013/0117698 A1 | 5/2013 | Park et al. |
| 2013/0301830 A1 | 11/2013 | Bar-El et al. |
| 2014/0068247 A1 | 3/2014 | Davis et al. |
| 2014/0160078 A1 | 6/2014 | Seo et al. |

OTHER PUBLICATIONS

"User Interface to Visualize Activity in Stream via an Icon/Symbol Tag Cloud", Anonymous, Jun. 18, 2012, IP.com No. IPCOM000219067D.

"System and Method of Unlocking a Mobile Device With Multiple Touches", Anonymous, Jul. 26, 2012, IP.com No. IPCOM000220223D.

* cited by examiner

MANAGING ACCESS TO AN ELECTRONIC SYSTEM

This application is a continuation of application Ser. No. 14/734,021 filed Jun. 9, 2015 entitled "MANAGING ACCESS TO AN ELECTRONIC SYSTEM", the disclosure of which is incorporated in its entirety herein by reference.

BACKGROUND

1. Technical Field

The present invention relates generally to managing access to an electronic system, and in particular, to a computer implemented method for managing access to an electronic system through a touchscreen device.

2. Description of Related Art

A variety of processes have been utilized to manage user access to an electronic system such as a computer or application such as an email or a web account. This often involves requiring a user to provide a user identifier and a password to authenticate that user. The electronic system then determines whether the user ID is in a database of user IDs and then determines whether the password provided by the user matches the password stored with the user ID in the database. Sometimes the user is also required to read a number periodically generated by a hardware or software token and then type that number in the electronic system for comparison to what the electronic system expected from an internally generated number using a parallel token. Other types of authentication systems are utilized in many different applications.

SUMMARY

The illustrative embodiments provide a method, system, and computer usable program product for managing access to an electronic system through a touchscreen device including presenting a display of a first and a second scrolling stream of icons; responsive to user input, detecting contemporaneous selection of a first icon from the first scrolling stream and a second icon from the second scrolling stream; and responsive to the selection of the first and second icon matching an established unlock pattern, unlocking the electronic system.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes and devices may be implemented and utilized for managing access to an electronic system through a touchscreen device. These processes and apparatuses may be implemented and utilized as will be explained with reference to the various embodiments below.

Figure 1:
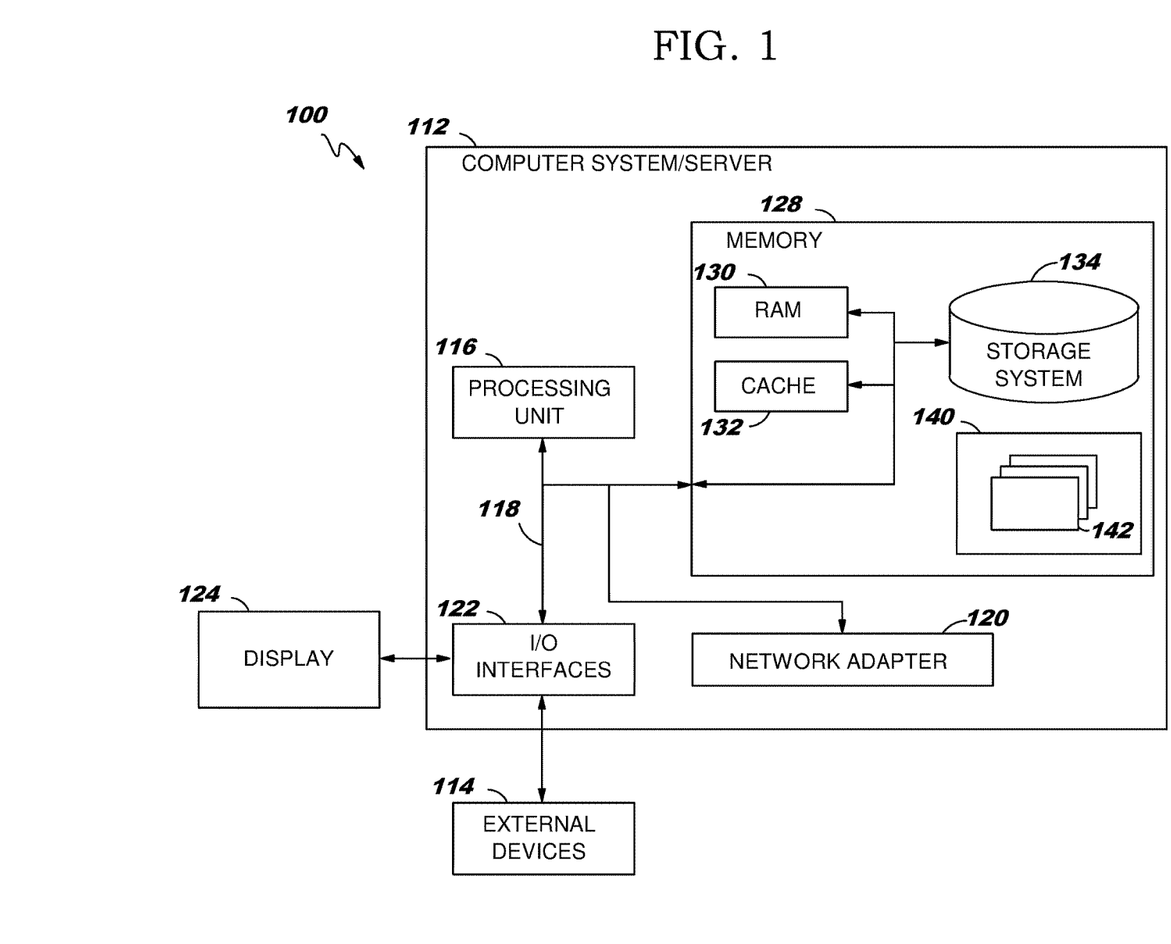
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as managing access to an electronic system through a touchscreen device.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for managing access to an electronic system through a touchscreen device.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
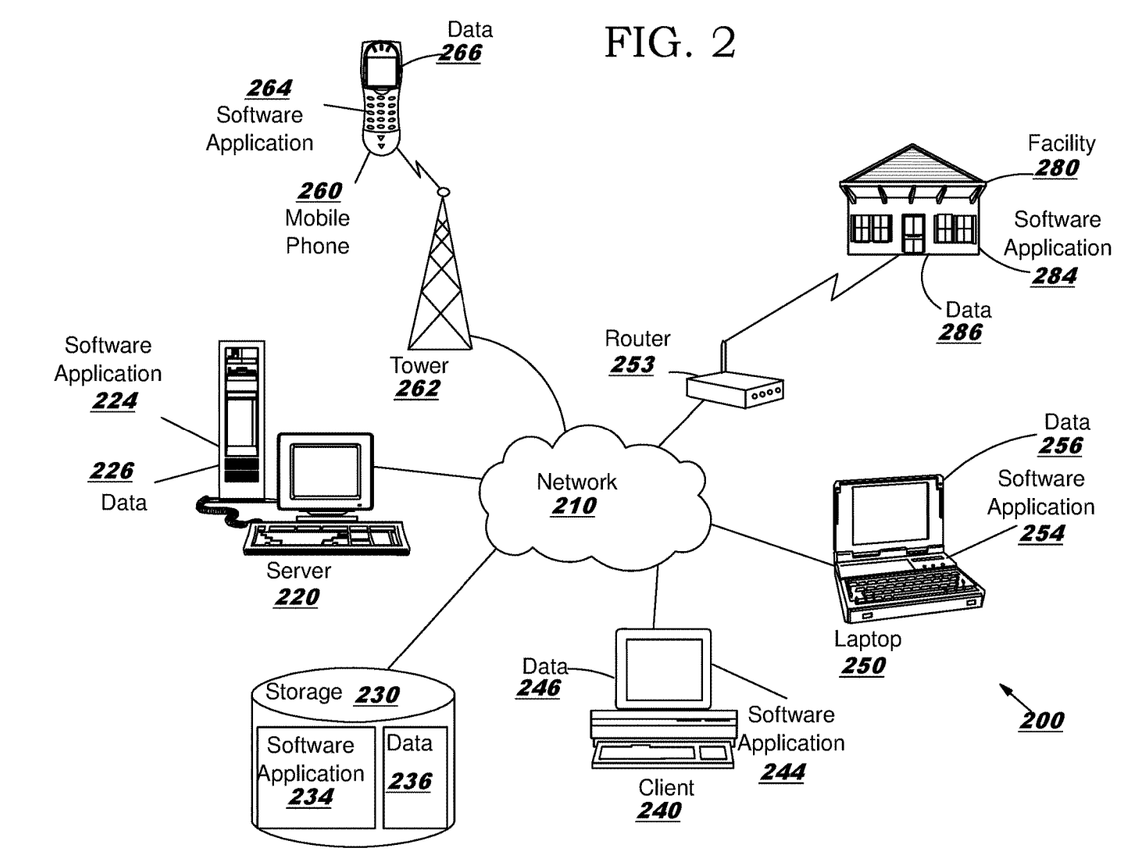
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for managing access to an electronic system through a touchscreen device may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing access to an electronic system through a touchscreen device or other software applications and data in accordance with embodiments described herein. Storage 230 may contain software application 234 and a content source such as data 236 for managing access to an electronic system through a touchscreen device. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application for managing access to an electronic system through a touchscreen device.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN).

FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3A:
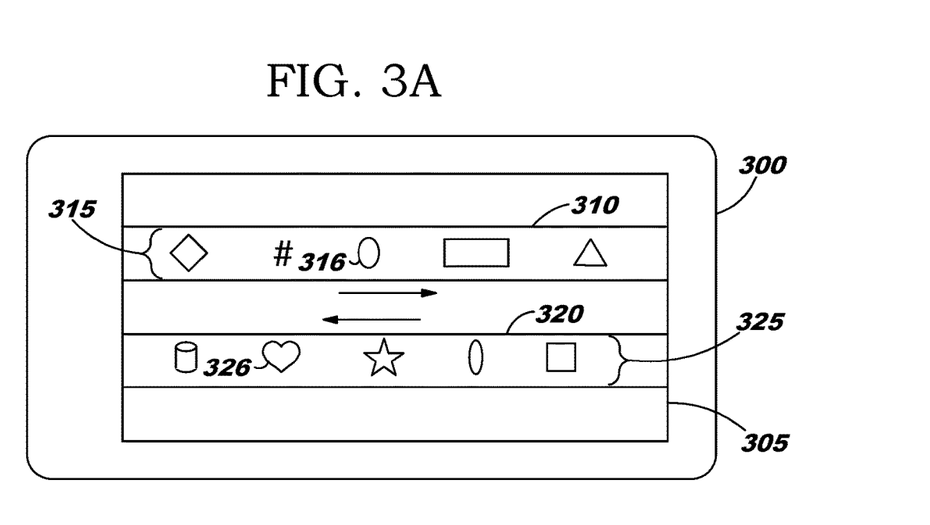
FIG. 3A through 3B are diagrams of icons scrolling across a display for selection by a user in which various embodiments may be implemented.
Figure 3B:
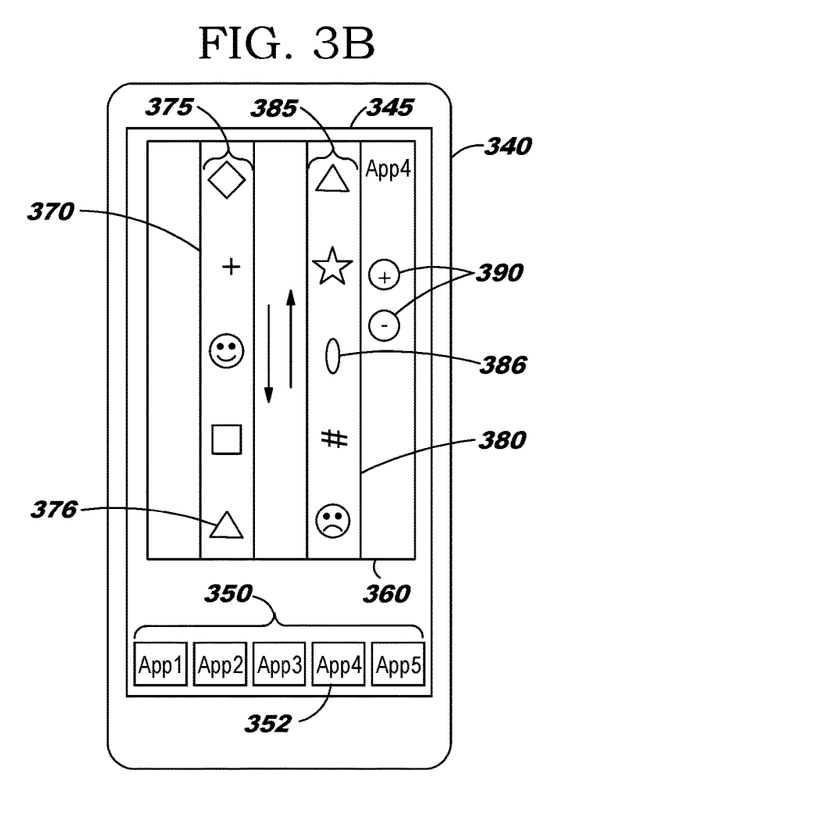

FIGS. 3A through 3B are diagrams of icons scrolling across a display for selection by a user in which various embodiments may be implemented. These diagrams illustrate techniques which may be utilized to prevent unauthorized persons from observing the user entering an icon based password. This helps prevent "over the shoulder" and other types of observation based attack. This icon based password entry system to authenticate a user may be utilized to unlock or otherwise access an electronic system such as an electronic device or a software application such as an email, web browser, document, etc.

In FIG. 3A an electronic system 300, such as a mobile phone, a tablet, a laptop, or other electronic device, includes a touchscreen 305. Touchscreen 305 displays two scrolling areas 310 and 320, each scrolling area including a set of displayed icons 315 and 325. A scrolling area is an area of the touchscreen where icons stream across that touchscreen for observation and selection by a user. In this example, scrolling area 310 streams from left to right and scrolling area 320 streams from right to left as indicated by the arrows (which may not be displayed). In alternative embodiments, the scrolling areas may stream in the same direction. In other embodiments, the scrolling speed may be the same or different for each scroll. The streaming for each scrolling area (also referred to herein as scrolling streams) may be continuous or lockstep. Although the scrolls are shown parallel to each other, they may be in other configurations such as perpendicular to or diagonally crossing each other. Although two scrolls are shown, three or more scrolls may be utilized.

Icons 315 and 325 are pictograms displayed on a device serving as quickly recognizable objects for selection by a user. Icons can have a variety of shapes, sizes, colors, orientation, etc. and may also perform certain functions such as blinking, rotating, or other types of recognizable functions. As icons 315 and 325 stream off of the display, they are replaced by other icons, which may be randomly different from or the same as the currently displayed icons. For example, icons 315 may constantly stream in the same sequence repeatedly and the same may apply to icons 325. Alternatively, icons 315 may stream from scrolling area 310 to scrolling area 320 and vice versa. In another alternative, the icons may be constantly placed with new or different icons. These can be options or features that are selected by a user as user preferences.

In this example, a user may need to select an oval 316 and a heart 326 concurrently or otherwise contemporaneously as those icons stream across touchscreen 305. Contemporaneously includes multiple icons being selected with an overlap for at least a point in time. That is, a first icon may be selected by the using touching that first icon on the touchscreen. Before the user stops touching that first icon, a second icon is touched by the user to select that second icon contemporaneously (also referred to herein as concurrently). The user can perform this by pressing icons 316 and 326 at or about the same time using fingers from the same or different hands. For example, if a user has a small touchscreen such as a mobile phone, then one hand may be holding the mobile phone and two fingers used on the other hand to select icons 316 and 326. In another example, if a user has a large screen touchscreen laptop, then both hands may be used to select icons 316 and 326. Once those icons are selected, then each scrolling area quickly goes blank as an icon is selected from that scrolling area and before the user has lifted his or her finger. This makes it very difficult for an unauthorized observer to identify the selected icons.

In FIG. 3B an electronic system 340, such as a mobile phone, a tablet, a laptop, or other electronic device, includes a touchscreen 345. Touchscreen 345 displays selectable icons 350 for multiple software applications, also referred to as Apps, at the bottom of the display. Each application can be a set of software performing a certain function such as email, a spreadsheet, a mapping system, a gas price search application, etc. Each application can be selected to run such as by touching or double touching the corresponding icon, or other known techniques. In this example, application App4 352 has been selected by a user to run, resulting in an application window 360 being opened at the top of display 345. However, the user must first perform an icon based user authentication process before the application can perform the desired tasks.

Application window 360 displays two scrolls 370 and 380, each scrolling area including a set of displayed icons 375 and 385. In this example, scrolling area 370 streams from top to bottom and scrolling area 380 streams from bottom to top as indicated by the arrows (which may not be displayed). In alternative embodiments, the scrolling areas may stream in the same direction. In other embodiments, the scrolling speed may be the same or different for each scroll. The streaming for each scrolling area may be continuous or lockstep. The speed of the streaming can be adjusted using plus and minus buttons 390. For example, if the user is located in a crowded environment, the user may speed up the speed of the icon scrolling streams to make it more difficult for others to observe the icons selected by the user. However, if the user is at home or work in a safe and uncrowded environment, the user may slow down the scrolling streams to make it easier to contemporaneously select the required icons for user authentication. Although the scrolling areas are shown parallel to each other, they may be in other configurations such as perpendicular to or diagonally crossing each other. Although two scrolling areas are shown, three or more scrolling areas may be utilized.

Icons 375 and 385 are pictograms displayed on a device serving as quickly recognizable objects for selection by a user. Icons can have a variety of shapes, sizes, colors, orientation, etc. and may also perform certain functions such as blinking, rotating, or other types of recognizable functions. As icons 375 and 385 stream off of the display, they are replaced by other icons, which may be randomly different from or the same as the currently displayed icons. For example, icons 375 may constantly stream in the same sequence repeatedly and the same may apply to icons 385. Alternatively, icons 375 may stream from scrolling area 370 to scrolling area 380 and vice versa. In another alternative, the icons may be constantly placed with new or different icons. These can be options or features that are selected by a user as user preferences.

In this example, a user may need to select a triangle 376 and an oval 386 concurrently or otherwise contemporaneously as those icons stream across touchscreen 345. The user can perform this by pressing icons 376 and 386 at or about the same time using fingers from the same or different hands. For example, if a user has a small touchscreen such as a mobile phone, then one hand may be holding the mobile phone and two fingers used on the other hand to select icons 376 and 386. In another example, if a user has a large screen touchscreen laptop, then both hands may be used to select icons 376 and 386. Once those icons are selected, then each scrolling area quickly goes blank as an icon is selected from that scrolling area and before the user has lifted his or her finger. Alternatively, once those icons are selected, then the selected icons will change appearance from the originally selected icon (e.g., change shape, color, etc.). This makes it very difficult for an unauthorized observer to identify the selected icons. Also, the stream of icons may stop moving as an icon is selected within that stream so that the selected icon does not move out from under the user's finger to be observed during the selection process.

In this example, two triangles are shown, one for each scroll. This allows for various options. For example, the user may be required to select a triangle form the left scrolling area and an oval from the right scroll, without exception. Alternatively, the user may be required to select a triangle from either scrolling area while selecting an oval from the other scroll. In another alternative, the user may be allowed to pick a triangle and an oval from either scroll, thereby allowing the user to select both from scrolling area 385. These types of options or features can be selected by a user as user preferences.

Figure 4:
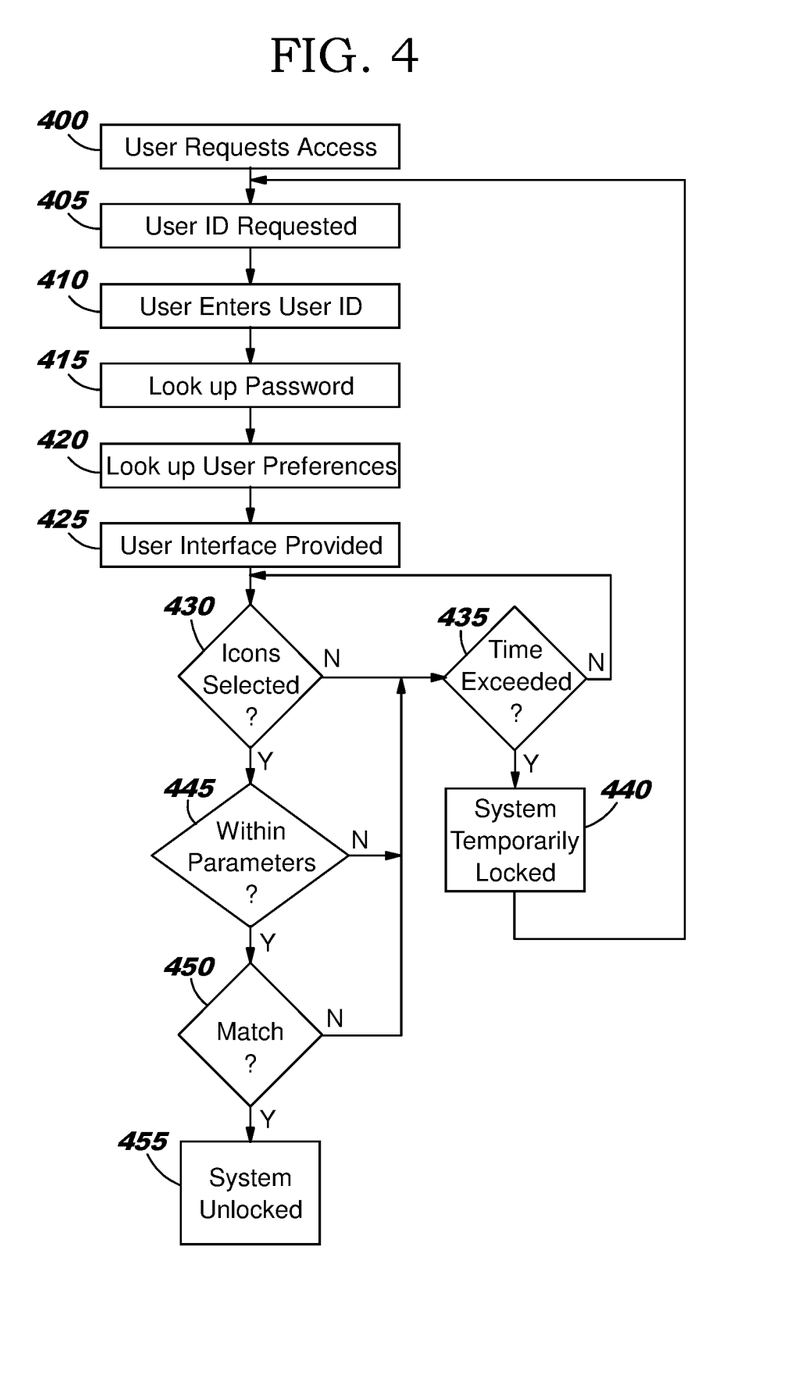
FIG. 4 is a flow diagram of user authentication in accordance with a first embodiment.

FIG. 4 is a flow diagram of user authentication in accordance with a first embodiment. It is through this user authentication that access to an electronic system is managed. The electronic system may be an electronic device such as a mobile phone, tablet, or laptop, or it may be an application or other type of software running on an electronic device.

In a first step 400, the user requests access to the electronic system. The user can make this request by turning on or otherwise waking up an electronic device (e.g., by swiping the screen or pressing a mechanical button). The user can also make this request by selecting an application for running or waking up that application through a user interface. Then in step 405, the electronic system requests a user identifier (user ID) through a user interface. This can be a unique identifier of the user distinct from other users. However, in some cases no user identifier may be needed where there is a single user or a limited number of users of the electronic system. The user identifier may be an alphanumeric or similar type of identifier. Alternatively, the user identifier may be a selection of icons such as will be described below with reference to the user entering an icon based password. Other type of techniques may be utilized such as the user swiping a credit card, bringing an RFID (radio frequency identifier) chip within range of the electronic system, etc. In step 410, the user enters the user identifier such as by typing in that identifier.

The electronic system then uses the user identifier to obtain the user icon based password in a secure password database in step 415. The password database may be encrypted using the user identifier or a variant thereof (e.g., the user identifier plus a predetermined number) of secured using other known techniques. A set of user preferences are also obtained from a user preference database in step 420. The user preference database may be separately stored from the password database or stored in the same database as the user password. Security protocols may also be utilized to protect these user preferences. These user preferences may be set by the user of the electronic system, an administrator of electronic systems such as with an IT (information technology) group.

In step 425, a user interface for allowing the user to select the user icon based password is generated and displayed on a touchscreen display, using the user preferences from the user preference database. This can include two scrolling areas of streaming icons such as described above with reference to FIGS. 3A and 3B. The types of icons displayed, the speed of the scrolling streams, the randomness of the icons, etc. are all in accordance with the user preferences.

In step 430, it is determined whether the user has selected some icons from the user interface. This can be utilizing signals received from the touchscreen display, which may be provided by the operating system of the electronic device. If no selection has been made, then processing proceeds to step 435, otherwise processing continues to step 445. In step 435, it is determined whether a predetermined time limit has been exceeded. This time limit can be controlled by the user preferences. If the time limit has not been exceeded, then processing returns to step 430 until the user makes a selection or the time limit is exceeded. Otherwise, processing continue to step 440 where the electronic system may be locked and not usable for a period of time, which may also be controlled by user preferences. Once that time period has been met, processing returns to step 405 above. Alternative embodiments may utilize other types of known methods for handling password entry time limits.

In step 445, it is determined whether the user selection of the icons was within acceptable parameters, some of which may also be controlled by user preferences. If yes, then processing continues to step 450, otherwise processing returns to step 435. For example, if the selection of the icons was not contemporaneous, then the user selection may not be acceptable. For another example, if the selection of the icons were from the same scrolling area and user preferences require selection from each scroll, then the user selection may not be acceptable.

In step 450, it is determined whether the icons selected match the user icon based password. If not, then processing returns to step 435, otherwise processing continues to step 455. In step 455, the user has passed user authentication as described above, so the electronic system is unlocked or otherwise made available for the user to utilize. This can include unlocking a mobile phone, allowing an application to run, etc. Processing then ceases of this user authentication process.

In an alternative embodiment, the user may be required to successfully enter multiple sets of icon selections. That is, the user may successfully select a first pair of icons, but then be required to successfully select a second pair of icons to have fully provided the icon based password. An example would be a diamond/heart selection followed by a star/oval selection. In such a case, if the user makes a correct selection in step 450, then processing would again return to step 435 so the user can start the second icon pair selection.

Figure 5:
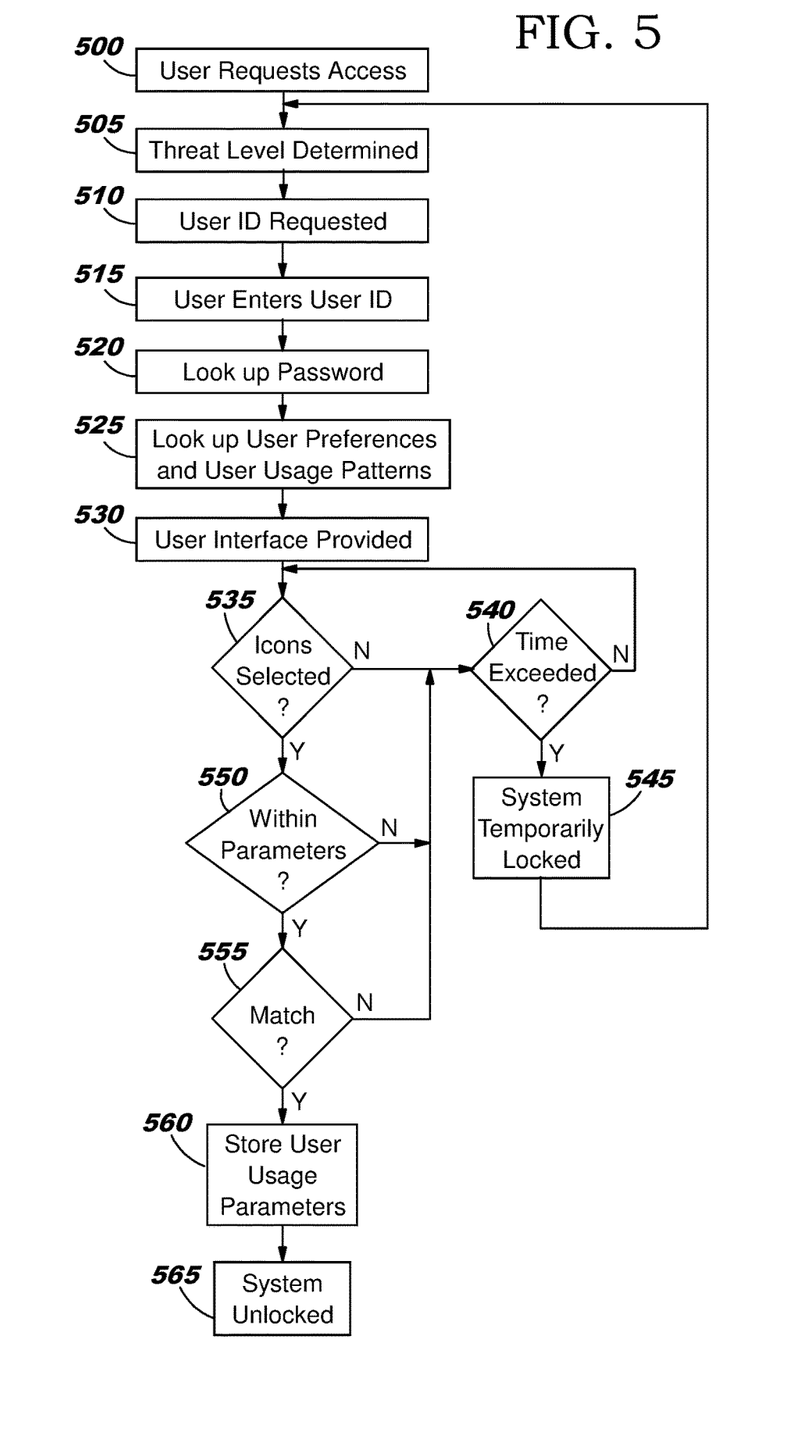
FIG. 5 is a flow diagram of user authentication in accordance with a second embodiment.

FIG. 5 is a flow diagram of user authentication in accordance with a second embodiment. It is through this user authentication that access to an electronic system is managed. The electronic system may be an electronic device such as a mobile phone, tablet, or laptop, or it may be an application or other type of software running on an electronic device. In this embodiment, certain features of the system are dynamically configurable as described below.

In a first step 500, the user requests access to the electronic system. The user can make this request by turning on or otherwise waking up an electronic device (e.g., by swiping the screen or pressing a mechanical button). The user can also make this request by selecting an application for running or waking up that application through a user interface. Then in step 505, the system assesses the local environment of the user to determine a potential threat level. For example, if the user is on his mobile device at home then the threat level may be low. If the user is at work and there are few people standing nearby, then the threat level may be low. If the user is away from home or work and is in a crowded area, then the threat level may be high. These threat levels can be determined through various techniques. For example, the location of the user (and the interface to the system the user is attempting to access) may be based on previously supplied data from the user and location information such as GPS coordinates or locally identified Wi-Fi signals. The user may be queried for his or her location. The system may also listen through a microphone for sounds of other persons. The system may also utilize a system camera to visually determine whether other persons are present. The user may also select a threat level or change the threat level unless there are built in limitations to such user selection such as by a system administrator. This threat level is then utilized as described below.

Then in step 510, the electronic system requests a user identifier (user ID) through a user interface. This can be a unique identifier of the user distinct from other users. However, in some cases no user identifier may be needed where there is a single user or a limited number of users of the electronic system. The user identifier may be an alphanumeric or similar type of identifier. Alternatively, the user identifier may be a selection of icons such as will be described below with reference to the user entering an icon based password. Other type of techniques may be utilized such as the user swiping a credit card, bringing an RFID (radio frequency identifier) chip within range of the electronic system, etc. In this embodiment, with prior approval of the user, certain features of the user may be automatically identified and utilized by the device as sufficient verification of the user to obtain the userid from memory if threat levels are sufficiently low. For example, facial recognition or voice recognition of the user may be utilized. Also, the typing or other device manipulative characteristics of the user may be utilized to verify the user sufficiently to pull the userid from memory. Please note that the user will still need to provide an icon based password. In step 515, the user enters the user identifier such as by typing in that identifier or by the other alternatives described above.

The electronic system then uses the user identifier to obtain the user icon based password in a secure password database in step 520. The password database may be encrypted using the user identifier or a variant thereof (e.g. the user identifier plus a predetermined number) of secured using other known techniques. A set of user preferences and user usage patterns are also obtained from a user preference database in step 525. The user usage patterns are a set of statistical and other patterns observed about the user by the system and may be stored with or separately from the user preferences. The user preference database may be separately stored from the password database or stored in the same database as the user password. Security protocols may also be utilized to protect these user preferences. These user preferences may be set by the user of the electronic system, an administrator of electronic systems such as with an IT (information technology) group.

In step 530, a user interface for allowing the user to select the user icon based password is generated and displayed on a touchscreen display, using the user preferences, user usage patterns, and the threat level. This can include two scrolling areas of streaming icons such as described above with reference to FIGS. 3A and 3B. The types of icons displayed, the speed of the scrolling streams, the randomness of the icons, etc. are all in accordance with the user preferences, user usage patterns, and the threat level. For example, the threat level may be medium and the user may request in user preferences that the icons stream proceed at a medium speed. However, user usage patterns may show that a medium speed is very difficult for the user and the speed may be reduced somewhat as a result. That is, if the user struggles too long to enter the icon based password, it may give an unwelcome observer more time to ascertain the password.

In step 535, it is determined whether the user has selected some icons from the user interface. This can be utilizing signals received from the touchscreen display, which may be provided by the operating system of the electronic device. If no selection has been made, then processing proceeds to step 540, otherwise processing continues to step 550. In step 540, it is determined whether a predetermined time limit has been exceeded. This time limit can be controlled by the user preferences. If the time limit has not been exceeded, then processing returns to step 535 until the user makes a selection or the time limit is exceeded. Otherwise, processing continue to step 545 where the electronic system may be locked and not usable for a period of time, which may also be controlled by user preferences. Once that time period has been met, processing returns to step 505 above. Alternative embodiments may utilize other types of known methods for handling password entry time limits.

In step 550, it is determined whether the user selection of the icons was within acceptable parameters, some of which may also be controlled by user preferences. If yes, then processing continues to step 555, otherwise processing returns to step 540. For example, if the selection of the icons was not contemporaneous, then the user selection may not be acceptable. For another example, if the selection of the icons were from the same scrolling area and user preferences require selection from each scroll, then the user selection may not be acceptable.

Then in step 555, it is determined whether the icons selected match the user icon based password. If not, then processing returns to step 540, otherwise processing continues to step 560. In step 560, statistical measures of the user's ability to enter the password are stored in memory. For example, certain user usage parameters or statistics such as the speed of the scrolling stream, the number of missed opportunities that the user incurred before selecting the correct password, the number of failed attempts, etc. are then stored or accumulated in memory. In step 565, the user has passed user authentication as described above, so the electronic system is unlocked or otherwise made available for the user to utilize. This can include unlocking a mobile phone, allowing an application to run, etc. Processing then ceases of this user authentication process.

In an alternative embodiment, the user may be required to successfully enter multiple sets of icon selections. That is, the user may successfully select a first pair of icons, but then be required to successfully select a second pair of icons to have fully provided the icon based password. An example would be a diamond/heart selection followed by a star/oval selection. In such a case, if the user makes a correct selection in step 555, then processing would again return to step 540 so the user can start the second icon pair selection.

Figure 6:
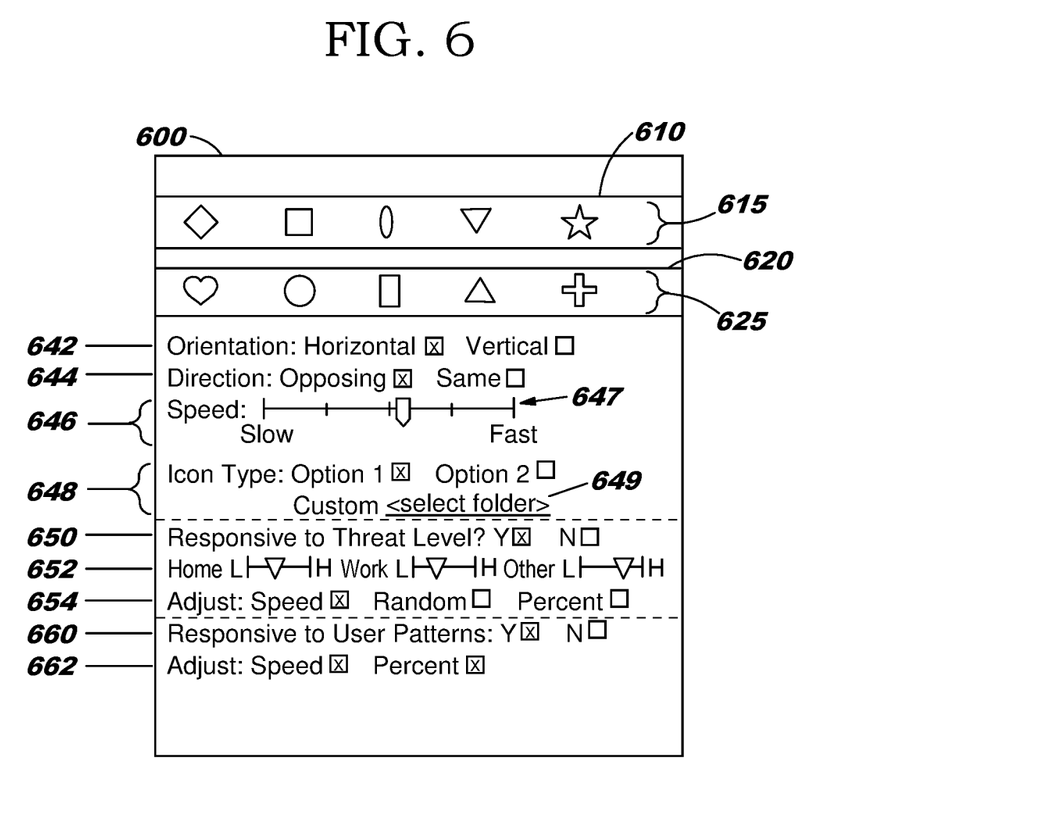
FIG. 6 is a diagram of a user interface for setting user preferences in which various embodiments may be implemented.

FIG. 6 is a diagram of a user interface for setting user preferences in which various embodiments may be implemented. This user interface may be utilized by the user that enters the icon based password or by another person such as a system administrator. Certain preconfigured choices may come from the factory and then can be reconfigured through the user interface. In addition, a system administrator may set certain choices and then allow the user to make some limited choices. A special administrative password may be required to access user interface 600. Alternatively, user interface 600 may be accessible when the user enters the icon based password.

User interface 600 includes two scrolling areas 610 and 620, each scrolling area including a set of displayed icons 615 and 625. As the user makes choices, those choices can be reflected in the two scrolling areas 610 and 620 as described below. User interface 600 also includes a set of choices starting with the orientation 642 of the scrolls. The scrolling areas are shown in a horizontal orientation, but the user may select a vertical orientation. The user can change this selection by checking the box to the right of the desired orientation. The direction 644 of the icon streams can be opposing (with the top scrolling area moving left to right and the bottom scrolling area moving from right to left) or in the same direction. The direction selection can be reflected in scrolling areas 610 and 620. An opposing direction may be preferred to make it more difficult from someone to identify which icons the user selects, but a user may find that approach too difficult and may select the same direction option. The general speed 646 of the scrolling streams may also be adjusted. In this case, a sliding scale 647 is shown where the user can increase or decrease the speed of the scrolling streams. The speed adjustment can be immediately shown in the above scrolling areas so the user can see the effect of his or her choice of speed.

The user can then select the types of icons 648 to be displayed. Icons are pictograms displayed on a device serving as quickly recognizable objects for selection by a user. Icons can have a variety of shapes, sizes, colors, orientation, etc. and may also perform certain functions such as blinking, rotating, or other types of recognizable functions. In this case, there are three choices provided in this example: Option 1, Option 2, or Custom 649. Many other types of icons can be available for selection. When the user makes a selection, that selection is shown in the scrolling areas above. This allows the user to visually confirm his or her choice. If the user selects Custom, then the user provides a link to a folder where the custom icons are stored. This can be accomplished through a simple file lookup. Again, the custom selection is displayed in the scrolling areas above so the user can visually confirm his or her choice.

The user can select whether the icon selection process is responsive to threat detection 650. The user can then determine the general threat level at several locations 652 such as home, work and other. The user can then determine how much various attributes of the icons streams are adjusted 654 as a result of the threat detection. For example, the user may request only the speed of the icon streaming is affected, although other attributes could be affected such as randomizing the icon stream and decreasing the percentage of correct icon pairs.

The user can also select whether various aspects of the data scrolling can be affected by user usage patterns 660. The user can select various aspects of icon streaming for adjustment 662 such as speed and decreasing the percentage of correct icon pairs. For example, a user may demonstrate a high level of errors when entering an icon based password if the speed of the icon streams is above a certain level. Also, the user may demonstrate a low level of errors by the right hand compared to the left hand. As a result, the speed of one icon stream may be reduced for that hand. It is these demonstrated patterns by the user that can be utilized to affect the icon based password entry process. These data analytics could also be utilized if allowed by a user.

There are many other aspects of the icon scrolling areas and streaming which can be user selectable. For example, the icon streams can be a continuous flow or lockstep, the speed of one scrolling area may be faster than the other scrolling area even if they are in the same direction or a different direction, etc. In addition, the percentage of correct icons can be increased or reduced so that a correct combination for selecting the password is more or less frequently available. The user can require multiple sets of icon selection to be required as a password. A set of three or more scrolling areas may be utilized to further strengthen the icon based password. The threat level can be increased or reduced based on auditory or visual indications. Additional usage patterns may be utilized for improving the icon based password entry process. In addition, data analytics from usage patterns of many other users can be utilized as well. For example, certain icons colors may be harder for some users to select based on their age, sex or other characteristics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing access to an electronic system through a touchscreen device. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing access to an electronic system through a touchscreen device comprising:
    responsive to a user request to access the electronic system, generating an unlock user interface presenting a display of streaming icons for selection of respective streaming icons by the user, wherein the respective streaming icons are initially selected while in a streaming state across a first and second scrolling area, wherein a speed of the streaming icons is independent of user movement when the unlock user interface is presented and is selected in accordance with at least one of the group consisting of a set of user preferences stored in memory prior to the user request to access the electronic system, a user usage pattern observed prior to the user request to access the electronic system, and a threat level of an unauthorized person;
    responsive to user input through the user interface, detecting contemporaneous selection of a first streaming icon from the first scrolling area and a second streaming icon from the second scrolling area; and
    responsive to the selection of the first and second streaming icon matching an established unlock pattern, unlocking the electronic system.

2. The method of claim 1 wherein the first and second scrolling areas include icons streaming concurrently in different directions.

3. The method of claim 1 further comprising identifying a threat level of unauthorized persons near the electronic system; and based on the identified threat level adjusting the speed of icons streaming across the display in response to the user request to access the electronic system.

4. The method of claim 3 further comprising:
    detecting a location of the electronic system; and
    determining the threat level of an unauthorized person from the detected location.

5. The method of claim 1 further comprising:
    receiving, for storage in memory, the set of user preferences for streaming icons across a first scrolling area and a second scrolling area; and
    subsequent to receiving the set of user preferences, receiving the user request to access the electronic system.

6. The method of claim 1 further comprising:
    responsive to user input through the user interface, detecting contemporaneous selection of a third icon from the first scrolling area and a fourth icon from the second scrolling area; and
    responsive to the selection of the first, second, third and fourth streaming icons matching an established unlock pattern, unlocking the electronic system.

7. The method of claim 1 wherein the user preferences for streaming icons includes at least of the following:
    speed of the icons streaming across the scrolling areas;
    a type of icons streaming across the scrolling areas; and
    display functions of the icons streaming across the scrolling areas.

8. A computer program product for managing access to an electronic system through a touchscreen device, the computer program product comprising a non-transitory computer readable storage medium having program instructions embodied therewith, the program instructions executable by a processing circuit to cause the device to perform a method comprising:
    responsive to a user request to access the electronic system, generating an unlock user interface presenting a display of streaming icons for selection of respective streaming icons by the user, wherein the respective streaming icons are initially selected while in a streaming state across a first and second scrolling area, wherein a speed of the streaming icons is independent of user movement when the unlock user interface is presented and is selected in accordance with at least one of the group consisting of a set of user preferences stored in memory prior to the user request to access the electronic system, a user usage pattern observed prior to the user request to access the electronic system, and a threat level of an unauthorized person;
    responsive to user input through the user interface, detecting contemporaneous selection of a first streaming icon from the first scrolling area and a second streaming icon from the second scrolling area; and
    responsive to the selection of the first and second streaming icon matching an established unlock pattern, unlocking the electronic system.

9. The computer program product of claim 8 wherein the first and second scrolling areas include icons streaming concurrently in different directions.

10. The computer program product of claim 8 further comprising identifying a threat level of unauthorized persons near the electronic system; and based on the identified threat level adjusting the speed of icons streaming across the display in response to the user request to access the electronic system.

11. The computer program product of claim 10 further comprising:
    detecting a location of the electronic system; and
    determining the threat level of an unauthorized person from the detected location.

12. The computer program product of claim 8 further comprising:
    receiving, for storage in memory, the set of user preferences for streaming icons across a first scrolling area and a second scrolling area; and
    subsequent to receiving the set of user preferences, receiving the user request to access the electronic system.

13. The computer program product of claim 8 further comprising:

responsive to user input through the user interface, detecting contemporaneous selection of a third icon from the first scrolling area and a fourth icon from the second scrolling area; and responsive to the selection of the first, second, third and fourth streaming icons matching an established unlock pattern, unlocking the electronic system.

14. The computer program product of claim 8 wherein the user preferences for streaming icons includes at least of the following:

speed of the icons streaming across the scrolling areas;
a type of icons streaming across the scrolling areas; and
display functions of the icons streaming across the scrolling areas.

15. A data processing system for managing access to an electronic system through a touchscreen device, the data processing system comprising:

a processor; and
a memory storing program instructions which when executed by the processor execute the steps of:
responsive to a user request to access the electronic system, generating an unlock user interface presenting a display of streaming icons for selection of respective streaming icons by the user, wherein the respective streaming icons are initially selected while in a streaming state across a first and second scrolling area, wherein a speed of the streaming icons is independent of user movement when the unlock user interface is presented and is selected in accordance with at least one of the group consisting of a set of user preferences stored in memory prior to the user request to access the electronic system, a user usage pattern observed prior to the user request to access the electronic system, and a threat level of an unauthorized person;
responsive to user input through the user interface, detecting contemporaneous selection of a first streaming icon from the first scrolling area and a second streaming icon from the second scrolling area; and
responsive to the selection of the first and second streaming icon matching an established unlock pattern, unlocking the electronic system.

16. The data processing system of claim 15 wherein the first and second scrolling areas include icons streaming concurrently in different directions.

17. The data processing system of claim 15 further comprising identifying a threat level of unauthorized persons near the electronic system; and based on the identified threat level adjusting the speed of icons streaming across the display in response to the user request to access the electronic system.

18. The data processing system of claim 17 further comprising:

detecting a location of the electronic system; and
determining the threat level of an unauthorized person from the detected location.

19. The data processing system of claim 15 further comprising:

receiving, for storage in memory, the set of user preferences for streaming icons across a first scrolling area and a second scrolling area; and
subsequent to receiving the set of user preferences, receiving the user request to access the electronic system.

20. The data processing system of claim 15 further comprising:

responsive to user input through the user interface, detecting contemporaneous selection of a third icon from the first scrolling area and a fourth icon from the second scrolling area; and
responsive to the selection of the first, second, third and fourth streaming icons matching an established unlock pattern, unlocking the electronic system.

\* \* \* \* \*